(No Model.)
W. W. JACQUES.
Insulating Compound.
No. 231,583.  Patented Aug. 24, 1880.
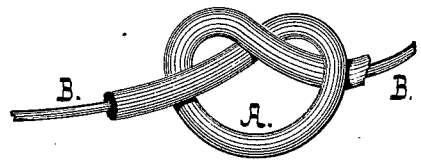
Witnesses,
W. A. Bertram
C. H. Barclay
Inventor,
W. W. Jacques
by
R. D. Williams
Attorney.

UNITED STATES PATENT OFFICE.

WILLIAM W. JACQUES, OF BALTIMORE, MARYLAND.

INSULATING COMPOUND.

SPECIFICATION forming part of Letters Patent No. 231,583, dated August 24, 1880.

Application filed May 13, 1880. (No model.)

*To all whom it may concern:*

Be it known that I, WILLIAM W. JACQUES, of Baltimore city, State of Maryland, have invented certain new and useful Improvements in Insulators for Electric Conductors; and I hereby declare the same to be fully, clearly, and exactly described as follows.

The object of this invention is to provide an insulating coating for telegraph-wires and other electric conductors which shall have a high insulating power, and at the same time be tough, pliable, and elastic under any conditions of temperature or weather to which it would naturally be exposed, which shall be entirely impermeable to water, gases, or moisture, and not affected by atmospheric influences nor liable to change with time, and, finally, which shall be much cheaper than the substances usually employed for the same purpose.

The covering is composed of rubber which has been subjected to a peculiar process, whereby a substance is mixed with it that imparts to the rubber certain desirable qualities, particularly that of durability. With this prepared rubber may be mixed a considerable quantity of one or more of the cheap substances ordinarily used to increase the bulk of the mass at small cost, such as oxide of zinc, litharge, steatite, or asphalt. Sulphur is also added in the usual proportions in order that the mass may be vulcanized.

It is well known among scientific men that the decay observed in rubber, particularly when exposed to the sun and atmospheric influences, is one of oxidation, whereby the hydrocarbon of the approximate composition carbon 90, hydrogen 10, is converted into an oxide of the approximate composition carbon 64, hydrogen 8, and oxygen 28—that is, the rubber takes into combination with itself, chemically, about one-quarter of its weight of oxygen, and the resultant product is crystalline in structure, brittle, permeable to fluids, and entirely unfit for an insulating-coating for telegraph-wires.

I have discovered that rubber, either pure or mixed with the ordinary diluents, has the power of taking considerable quantities of oxygen from the air or water into actual solution in itself and of condensing this oxygen in its pores. The oxygen so absorbed and condensed is nearly pure and in active condition to combine chemically with the rubber and destroy its valuable properties. The chemical union goes on most rapidly when the rubber is exposed to air and sunlight.

The process that I have invented destroys this solvent or absorbing power of the rubber, fills up its pores, and so prevents decay.

It consists in thoroughly impregnating the pores of the rubber, by a process hereinafter set forth, with a mixture of about equal parts of Venice turpentine and beeswax, though the proportions of the ingredients may be considerably varied, and then of mixing this impregnated rubber with more of the preserving compound, sulphur, and various diluents by continued working on warm rolls. The substance thus obtained is applied to the wire by known processes, and is then vulcanized in the usual way.

In carrying out the process I take a vessel conveniently arranged to be heated and to exclude the air by exhaustion through the medium of a suitable air-pump, and heat the preserving compound in the vessel to about 80° centigrade. The rubber is then added in the form of sheets, or, better, in the form known as "cracked rubber," and is submerged in the compound. The heat is then gradually raised to about 100° centigrade, the air at the same time being gradually exhausted from the vessel, and consequently from the pores of the rubber. I then admit the air and allow the mass to cool to about 80° centigrade, and remove the rubber, which will have absorbed from twenty to thirty per cent. of the compound. Rubber so treated will be found to have lost its power of absorption and to have its insulating power and impermeability to water and moisture greatly increased. It is also fitted to take up a larger proportion of cheapening diluents without losing its essential properties as a coating for wires. The rubber thus impregnated with the preserving compound is now mixed on warm rolls, in the usual way, with powdered sulphur enough to allow of vulcanization, and with an equal weight or more of some cheap substance to give bulk to the mass. Powdered steatite or asphalt answers the purpose very well, and their cost is but trifling.

A composition which I have found to give good results, and to be at the same time cheap, consists of rubber, thirty parts; preserving composition, seven parts; sulphur, three parts; oxide of zinc, ten parts; steatite, ten parts; asphalt, forty parts. Total, one hundred parts.

In mixing the rubber with the diluents it is well to add a small quantity of the preserving composition also. The whole must in any case be thoroughly mixed by long-continued working on the rolls.

The substance, being prepared in the way described, is formed upon the wire that it is desired to insulate by running the wire through a chamber heated to about 100° centigrade and containing the prepared rubber under pressure, the wire being finally drawn through a die in a manner similar to that in which wires are covered with gutta-percha. As an alternative for this method, the composition may be rolled into sheets, with which the wires are afterward covered; or other well-known means may be resorted to in order to coat the wires. The coated wires are finally packed in powdered soapstone and vulcanized in the usual way.

In the accompanying drawings is illustrated a section of wire, B, having the prepared coating A applied to it.

It is obvious that my invention is not limited to the single application of the prepared rubber hereinbefore set forth—namely, the coating of electric conductors.

Given the result of my discovery and the properties of the new composition embodying the same, numerous uses to which the composition are applicable suggest themselves.

Instead of coating the wires with the prepared rubber, they may be coated with ordinary rubber in the usual way, the coating being subsequently impregnated with the preserving composition, as described.

What I claim as my invention, and desire to secure by Letters Patent, is—

1. As a new article of manufacture, an electric conductor consisting of a metallic core coated with a compound containing rubber, beeswax, and Venice turpentine, as set forth.

2. The composition herein described, consisting of rubber, Venice turpentine, and beeswax, with or without diluents, substantially as and for the purpose set forth.

3. The process herein described for preventing the deterioration or decay of rubber insulators, consisting in subjecting the same to diminished pressure in presence of a preservative composition, as set forth, whereby the pores of the rubber are opened, and finally increasing the pressure in order to force the preservative into the pores, as described.

WILLIAM W. JACQUES.

Witnesses:
R. D. WILLIAMS,
JOHN C. GITTINGER.